April 8, 1952 R. W. FRICKE 2,591,692
TOOLHOLDER
Filed March 29, 1946
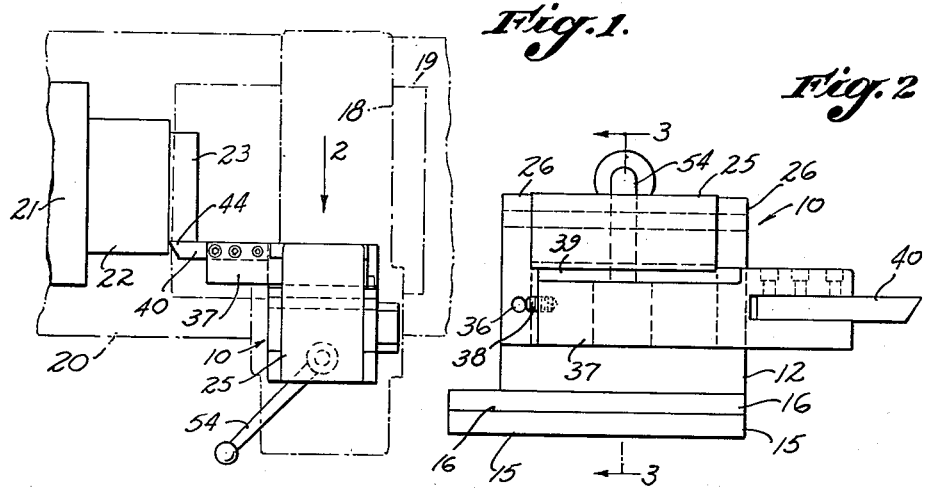
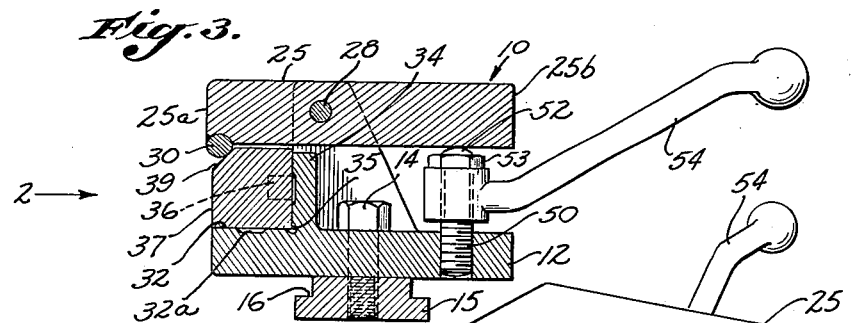
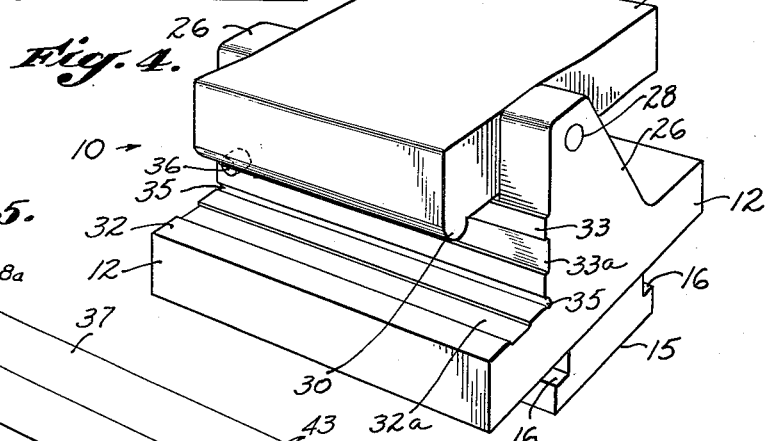
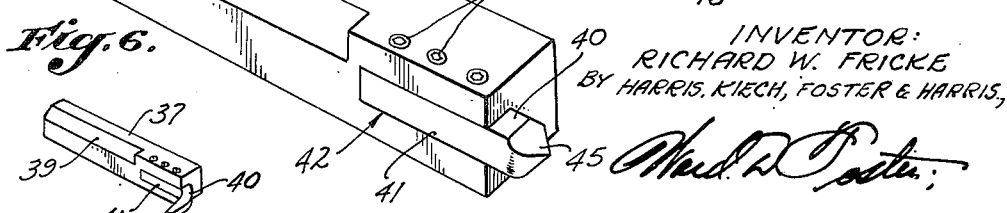
INVENTOR:
RICHARD W. FRICKE
BY HARRIS, KIECH, FOSTER & HARRIS,
FOR THE FIRM
ATTORNEY.

Patented Apr. 8, 1952

2,591,692

UNITED STATES PATENT OFFICE 2,591,692

TOOLHOLDER

Richard W. Fricke, San Gabriel, Calif., assignor to George G. Bakewell, South Pasadena, Calif.

Application March 29, 1946, Serial No. 658,343

11 Claims. (Cl. 29—96)

This invention relates to tool holding devices, and relates more particularly to those adapted for presenting a plurality of cutting tools successively to a piece of work carried in a chuck or collect while undergoing a plurality of machining operations.

An important object of this invention is to provide a simple, rugged tool holding device arranged and constructed for quick interchange of cutting tools, whereby accurate placement of each successive tool or a carrier therefor may be insured so that as extensive a series of precision operations may be conducted as desired.

In present machine practice, the number of operations possible on a given piece of work, without the necessity of a difficult job of resetting new cutting tools, is limited to the maximum number of cutting tools carried simultaneously on a single turret head mounted on the cross slide of the machine. Since the common turret head is limited to six tools, the number of different operations with one turret head assembly necessarily may not exceed six. This limited number is unsatisfactory, because more than six operations on a single piece of work are often necessary.

It is, therefore, a general object of this invention to provide a tool holder which will make possible as many operations as may be desired on a single piece of work, without either disturbing the work in its chuck or making it necessary to replace a tool holding unit such as a turret head or to laboriously reset new cutting tools. Thus, another object of the invention is to eliminate the employment of turret heads in machining operations.

In addition to these objects, it is a further object to provide a tool holding structure by means of which each of a plurality of readily removable cutting tools, or carriers having such cutting tools thereon, may be selectively, positively, and easily placed and bound in position against movement in all directions by means of a single clamping device. A kindred object is to provide in such a structure means assuring that the cutting tools, as interchanged, will be so accurately placed in ever instance that precision work will be possible.

I have found that it is possible to construct a tool holding device in which any desired number of cutting tools may be quickly and accurately placed and replaced, each placement and removal requiring only a simple operation by each hand of the operator. With this device, a plurality of tool carriers or tool bodies carrying the respective cutting tools is employed, all the carriers or bodies preferably having portions of identical size and shape so that they may be similarly placed and removably bound in operative position in the holding device by the same standardized movement in every instance. The holding device has a single elongated seat and a single clamping jaw or clamping arm to secure each carrier in the seat whereby to dispose each successive carrier and its cutting tool in the same general relationship with respect to the other cutting tools and with respect to the work. Thus, as the cutting tools and their carriers are interchanged, the tools are properly positioned to perform accurately and selectively all of a required series of operations upon work of any predetermined type. Having set the lathe or similar machine for a given series of operations upon a given type of work, and having properly set each of the cutting tools in their respective carriers, all operations may be readily and selectively performed regardless of the number of operations required, this being due to the fact that the interchange of the cutting tools and their carriers becomes a simple operation which is standardized as are the conventional operations required in lathe practice.

Other objects and features of this invention will become apparent to those skilled in this art, upon reference to the following specification and the accompanying drawing wherein:

Fig. 1 is a top plan view showing the general operative relationship of a tool holding device of this invention to various portions of a conventional lathe and a piece of work;

Fig. 2 is a front elevation of the tool holding structure as indicated by the arrow 2 of Fig. 3;

Fig. 3 is a cross section taken substantially on the line 3—3 of Fig. 2;

Fig. 4 is a top perspective view; and

Figs. 5 and 6 are perspective views of identical tool carriers adapted for use in the present tool holding device, and indicating how different cutting tools may be arranged in these identical carriers.

In the drawing, the present improved tool holding device is generally indicated by the reference numeral 10. It comprises a block 12, constituting a base member which is adapted to be mounted on a lathe or the like through the medium of a pivoting lock bolt 14 and an elongated guide nut 15 whose sides are rabbeted to provide shouldering portions 16 to be received in conventional T-slots in a conventional cross slide 18, Fig. 1, mounted for transverse sliding movement on a carriage 19 longitudinally slidable in a conventional manner upon a bed 20 of a lathe. As indicated in Fig. 1 the tool holder 10 and the cutting tool carried thereby are adapted to be generally aligned with a spindle 21 having an ordinary chuck or collet 22 suitable for receiving and retaining a given piece of work 23.

The tool holding device 10, in addition to the block 12, comprises as a principal part a movable clamping jaw 25 which is carried by two ears 26 upstanding from and integral with the block 12, the jaw 25 being positioned and retained by pivot means 28 shown as extending through the jaw 25 and both ears 26.

The jaw 25 has a forward overhanging portion 25a which carries at the under side of its outermost portion a slightly depending engaging member 30, which may be an integrally cast lip or a length of rod, welded in position, approximately as indicated.

The forward portion 25a of the clamping jaw 25 overhangs a corresponding forward portion of the block 12 whose upper face 32 is ground to provide a horizontal wall of an angular tool holding seat. At the rear of the face 32 and the overhanging portion 25a, there is arranged a vertically extending face 33, disposed at right angles to the face 32 and spanning the entire distance from one of the ears 26 to the other ear 26. The face 33 is provided by the forward edges of the ears 26 and an integral wall 34 intervening between the ears 26.

The face 33 like the face 32, is ground to provide a perfectly true back wall forming the other member of the angular tool holding seat. If desired the faces 32 and 33 may be provided with shallow grooves 32a and 33a respectively, whereby to facilitate seating operations. At the apex of the angle formed by the two faces 32 and 33 there is a groove 35 adapted to receive loose particles that might otherwise accumulate and interfere with accurate positioning of the cutting tools. Provided at the remote end of one of the faces 32 and 33, and preferably at the remote end of the vertical face 33, a stop pin 36, or a lug, is positioned against which the corresponding end of each of a plurality of tool carriers 37 is adapted to abut. This pin 36 insures accurate positioning of each carrier 37 as it is moved into place. Desirably, the respective end of each carrier has an adjustable stop screw 38 fixed therein for engagement with the stop pin 36. A locking screw 38a retains the stop screw 38.

As illustrated, the faces 32 and 33 are arranged at a right angle to each other, and each tool carrier 37 is provided with corresponding bottom and rear walls also arranged at a right angle to each other. In general the cross section of each carrier 37 is square and it corresponds in size to the space lying below the overhanging end 25a of the clamping jaw 25 and defined by the seat faces 32 and 33. However, the principal body portion of each tool carrier 37 has its rectangular cross section modified by cutting away the edge of the respective carrier opposite the edge which fits into the seat formed by the faces 32 and 33 and is normally disposed adjacent the groove 35. By thus cutting away the outermost edge portion of each carrier 37, an inclined wall 39 is provided which is adapted to be engaged by the depending engaging member 30 on the adjacent overhanging outer edge of the clamping jaw 25.

Each tool carrier 37 is conveniently formed from a square bar of steel, and each bar is long enough to provide a portion which projects beyond the near side of the clamping jaw 25 and provides a mounting for a cutting tool 40 of suitable design. As shown in the drawing, each cutting tool 40 has a shank 41 which is seated in an appropriate socket or recess 42 formed in the projecting end of the carrier 37, appropriate set screws 43 being used to bind the respective shank 41 tightly in operative position. It is to be understood that other means may be provided for anchoring the various cutting tools, and that each tool carrier 37 employed for a given series of machining operations may carry a cutting tool 40 different or differently arranged from each other cutting tool employed in the various operations. Such difference in cutters is generally indicated by the cutting elements 44, 45 and 46 respectively indicated in Figs. 1, 5, and 6.

When a tool carrier 37 carrying its respective cutters is properly positioned against the stop 36 and in the seat formed by the faces 32 and 33, it is adapted to be clamped in that position by pressure of the depending engaging member 30 of the clamping jaw 25 against the inclined wall 39 of the respective carrier 37. Such clamping pressure may be applied through any wedge or cam means, and in the form shown is accomplished by a jack screw 50 which is threaded into a hardened threaded seat 51 in the rear portion of the block 12, so that the jack screw 50 serves as a cam or wedge device. The upper end of the screw 50 is rounded to form a pressure member 52 adapted to be forced against the under side of the rearward portion 25b of the clamping jaw 25. Secured to the jack screw 50 by a jam nut 53 is a handle 54 which projects from the rear of the tool holder 10 into a position convenient to the operator of the lathe or other machine upon which the tool holder is operatively mounted. By swinging the handle 54 through a relatively short arc, in opposite directions, the pressure member 53 may be caused successively to engage and release the rearward portion 25b of the clamping jaw 25 so as to cause the inclined wall 39 of the tool carrier 37 to be correspondingly engaged and released. Thus, when a tool carrier 37 is released by the engaging member 30, the carrier 37 may be withdrawn from its seat provided by the faces 32 and 33, so that another tool carrier 37 with a different cutting tool 40 may be substituted. Having moved the newly selected tool carrier 37 into position in its seat and against the stop 36, actuation of the handle 54 and the jack screw 50 causes this new tool carrier 37 to be bound in position. Thereupon, the cross slide 18 and the carriage 19 of the lathe are actuated in any conventional or preferred manner to move the respective tool 40 and its cutting element into operative position with respect to the work 23 carried in the chuck 22.

The tool retaining ends of the respective tool carriers 37 are respectively constructed so as to carry and properly position whatever type of cutting tool 40 may be required for any particular machining operation which it is to perform. Each cutting tool will be so positioned in its tool carrier 37 in relation to each other cutting tool and in relation to the work 23, that it will properly perform its desired function.

By reason of this arrangement of the various tools and respective tool carriers 37, and unlimited number of operations may be performed upon a given piece of work 23 by conventionally moving the tool holder 10 and any tool carried by it into machining position, conventionally withdrawing the tool holder 10, actuating the handle 54 to release the tool carrier 37 carried therein, removing the respective tool carrier 37 from its seat, substituting a second tool carrier 37, and actuating the handle 54 to bind the substituted carrier 37 in place. Since each tool carrier is accurately formed and the seat provided by the faces 32 and 33 is accurately ground, and all parts are accurately positioned with respect to the stop 36, an entire series of a multiplicity of operations may be successively performed in such a manner as to produce precision operations on all pieces of work of the same type. Since the tool holder 10 is adapted for rotary adjustment on the lock bolt 14, any angularity required in the tools 40 with respect to the work 23 may be readily secured. When a tool requires change or regrinding, the stop screw 38 in the end of the respective carrier 37 is adjusted to compensate, as for metal removed, so that the tool does not have to be reset in the carrier nor other change in setting made such as in the master stop on the lathe.

Since many variations of the generic invention disclosed will become apparent to those skilled in this art, it is intended to protect all forms within the scope of the claims.

I claim as my invention:

1. A tool holder comprising in combination: a block having two fixed, angularly disposed retaining walls forming an angular seat providing an apex, against which walls and in which apex a tool-carrier of corresponding angular cross section is adapted to be seated and to be thereby held against angular shift and to be clamped; an elongated clamping jaw having an intermediate portion pivotally mounted upon said block adjacent said seat, and providing an overhanging end portion adapted to engage said tool carrier at a position directly opposite from said apex to clamp said tool carrier simultaneously against both of said walls, said jaw having an actuable end portion remote from said overhanging portion; and means operable between a portion of said block and said end portion of said jaw for actuating said overhanging portion to clamp said carrier and to release the same.

2. A combination as in claim 1 including a tool carrier mounted in said angular seat and having said corresponding angular cross section, said seat holding said tool carrier against angular change.

3. A tool holder comprising in combination: a base member having upstanding ear means on an intermediate portion thereof and having at one end fixed, distinct, angularly disposed seating faces providing a seat with an apex adapted to hold a correspondingly shaped tool against angular movement; a clamping jaw having an intermediate portion pivotally mounted on said ear means and having one end overhanging said seat; and depending engaging means on the under side of the outermost portion of said overhanging end and normally disposed in a position opposed to said apex whereby to engage a tool member and bind the same in firm engagement with both of said seat faces; and means positioned between and engageable with the other ends of said base member and said jaw to actuate said jaw and force said engaging means into tool clamping position to bind said tool upon said faces.

4. A combination as in claim 3 wherein said base member is horizontally disposed and said seating faces are respectively horizontally and vertically disposed, and said depending engaging means is arranged to bear upon an inclined face at an outermost edge of a tool member in said seat.

5. A combination as in claim 3 wherein one of said faces is provided adjacent one end with a stop to position a tool member inserted in said seat.

6. A combination as in claim 3 wherein said base member is provided with means for pivotally mounting said holder on a lathe.

7. In combination: a tool holder having a horizontal base member; ears upstanding on said base member intermediate its ends; a rigid horizontal upwardly facing transverse seat wall provided at the forward end of said member; a rigid vertical forwardly facing transverse seat wall forward of said ears, said walls providing an angular seat whose apex is directed upward and outward; a tool member fitting snugly in said seat, said tool member lying transversely of said base member and carrying at one end a cutting tool projecting laterally from said base member, said tool member having an inclined longitudinal face opposed to said apex; a single clamping jaw pivotally mounted and retained on said ears and extending forward from said ears to overlie said horizontal seat wall and said tool member; a depending member at the forward edge of said jaw to engage said inclined face and bind said tool member in said apex and against both of said seat walls and to release said tool member for selective interchange with a plurality of tool members of substantially identical size and shape to be likewise held by said jaw; and actuating means between the rearward ends of said base member and said clamping jaw to force said jaw into clamping engagement and to relieve said jaw.

8. A combination as in claim 7 including a stop projecting from one of said seat walls to engage and position said tool members.

9. A tool holder comprising in combination: a block having two fixed, substantially flat, angularly disposed retaining walls forming an angular seat to receive a tool-carrying bar of corresponding angular cross section and retain it against angular shift; a single clamping jaw movably mounted on said block and having forwardly extending means overhanging said seat and adapted to engage said bar to force and clamp said bar positively against both of said walls of said seat; and actuating means for releasably holding said jaw in clamping engagement with said bar, said clamping jaw being pivoted on an intermediate portion of said block, and said actuating means and said seat being located on opposite sides of said intermediate portion.

10. A tool holder comprising in combination: a block having two fixed, angularly disposed retaining walls meeting at a sharp angle and forming an angular seat adapted to receive and hold a tool-carrying bar of corresponding angular cross section against angular shift, said bar having an angularly disposed face diagonally opposed to the apex of said angular seat when said bar is positioned in said seat; a clamping jaw pivotally mounted on said block on an axis transverse to said jaw with overhanging forwardly extending means adapted to engage said angular face of said bar to force and clamp said bar positively against both of said walls of said seat; and means for releasably holding said jaw in clamping engagement with said bar.

11. A tool holder comprising in combination: a base having two fixed retaining walls disposed at angles to each other forming an angular seat; a tool-carrying bar of corresponding angular cross section positioned in said seat against angular displacement therein; a single clamping jaw pivotally mounted on said base on an axis transverse to said jaw and having forwardly extending means overhanging said seat and bar to engage and clamp said bar positively against both of said walls of said seat; and actuating means for releasably holding said jaw in clamping engagement with said bar.

RICHARD W. FRICKE.

REFERENCES CITED

The following references are of record in the file of this patent:

UNITED STATES PATENTS

| Number | Name | Date |
|---|---|---|
| 844,689 | Reiss et al. | Feb. 19, 1907 |
| 932,286 | Jones | Aug. 24, 1909 |
| 963,746 | Colton | July 12, 1910 |

FOREIGN PATENTS

| Number | Country | Date |
|---|---|---|
| 235,569 | Great Britain | Jan. 14, 1926 |